Feb. 6, 1968               L. I. DANIEL            3,368,011
METHOD AND APPARATUS FOR USE IN THE MANUFACTURE
OF ASBESTOS-CEMENT ARTICLES
Filed Dec. 15, 1964

INVENTOR.
LEONARD I. DANIEL
BY
*John L. McKinney*
ATTORNEY

United States Patent Office 3,368,011
Patented Feb. 6, 1968

3,368,011
METHOD AND APPARATUS FOR USE IN THE MANUFACTURE OF ASBESTOS-CEMENT ARTICLES
Leonard Irving Daniel, Flagtown, N.J., assignor to Johns-Mansville Corporation, New York, N.Y., a corporation of New York
Filed Dec. 15, 1964, Ser. No. 418,453
4 Claims. (Cl. 264—72)

ABSTRACT OF THE DISCLOSURE

A process for shaping a spigot end profile on an asbestos-cement pipe by the compaction and densification of the asbestos-cement material while the asbestos-cement pipe is still on the mandrel on which it was formed.

---

This invention relates to method and apparatus for the manufacture of articles which are formed on a mandrel from a wet stock and more particularly is directed to the manufacture of asbestos-cement pipe from a wet asbestos-cement material. More specifically, the invention is directed to method and apparatus for the manufacture of asbestos-cement pipe in which the end portion of the asbestos-cement is acted upon while the asbestos-cement material is still uncured so as to provide the asbestos-cement pipe with a desired profile.

The conventional method of manufacturing asbestos-cement pipe involves winding a wet sheet of asbestos-cement material on a rotating, hollow mandrel while applying high pressure thereto. When a pipe of suitable wall thickness has been formed, the mandrel is removed from the pressure applying means and the pipe is then removed from the mandrel for curing. After the pipe has been cured, the peripheral surface of the pipe adjacent its ends is machined so as to form the peripheral surface of the pipe with a desired type of end profile. This additional machining operation is necessary so that the pipe end may be properly received in the couplings and fittings required by all pipe lines. It is well recognized that this additional machining operation is undesirable and many attempts have been made to eliminate it. Some manufacturers have gone so far as to make plain pipe ends and provide complicated couplings. However, this is no real solution to the problem. The instant application eliminates this additional machining operation while still providing pipe with end profiles that are satisfactory for many uses.

It is an object of the instant invention to provide method and apparatus for forming an end profile on asbestos-cement pipe while the asbestos-cement material is in an uncured state.

The foregoing object is accomplished in accordance with the instant invention by a system in which a mold is repeatedly impacted against the end portion of an asbestos-cement pipe to provide the end portion with a desired profile. In the preferred embodiment of the invention, a rigid, hollow steel mold is provided with an internal cavity having a profile complementary to the profile desired for the external peripheral surface of the end portion of an asbestos-cement pipe. A mandrel having an uncured asbestos-cement pipe bonded thereto is supported in a relatively fixed position. The mold is attached to an impacting means such as a conventional air hammer. The mold is placed over the end portion of the mandrel and the pipe, and the air hammer is actuated so that the mold is repeatedly impacted against the end portion of the pipe. This impacting is continued while effecting relative axial movement between the end portion of the pipe and the mold until the desired profile has been formed on the end portion of the pipe.

The invention will be more fully understood and further objects and advantages thereof will become apparent when reference is made to the following detailed description of a preferred embodiment of the invention and the accompanying drawings in which.

Figure 1:
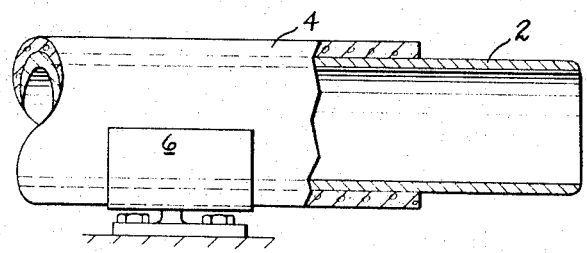
FIG. 1 is a side elevation with parts in section illustrating the mandrel and the pipe in position.

Referring to the drawings, there is illustrated in FIG. 1 a mandrel 2 having an asbestos-cement pipe 4 bonded thereto. The asbestos-cement material in the pipe 4 is in the uncured or at least only partially cured state. The mandrel 2 with the asbestos-cement pipe 4 bonded thereto is seated in the fixed support 6 which is suitably shaped to receive the pipe 4. The mandrel 2 and pipe 4 are restrained against axial movement in one direction by any conventional means (not shown) such as by abutting the other end of the mandrel 2 against a fixed block.

Figure 2:
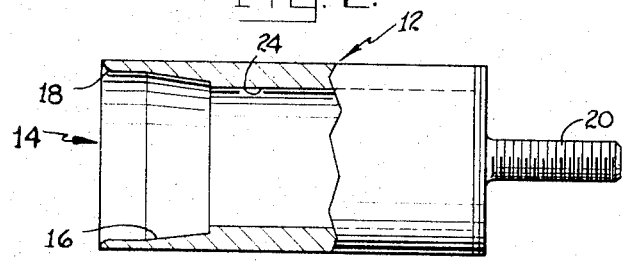
FIG. 2 is a side elevation with parts in section of the mold of the instant invention.
Figure 3:
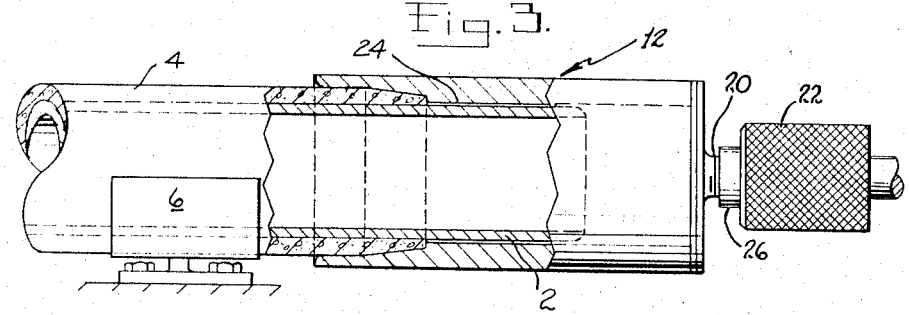
FIG. 3 is a side elevation illustrating the impacting operation.

In FIG. 2, there is illustrated a rigid mold 12 having at one end an internal cavity 14 having a profile 16 complementary to the profile which is desired to form on the end portion of the pipe 4. The entrance portion 18 of the cavity 14 is rounded and tapered so that the mold may be readily positioned over the end portion of the pipe. The diameter of the tapered portion is greater than the outside diameter of the uncured pipe 4. At its other end, the mold 12 is provided with an adaptor 20 so that the mold 12 may be readily attached to an air hammer 22 as illustrated in FIG. 3. The mold 12 is further provided with an internal cavity 24 adapted to receive the end of the mandrel 2 and properly position the mold 12 relative to the end portion of the pipe 4.

Figure 4:
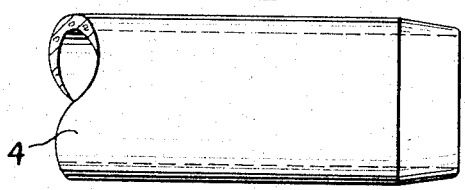
FIG. 4 is a side view of an end portion of the finished pipe.

In operation, the mold 12 is secured to the air hammer 22 by inserting the adaptor 20 into the chuck 26 of the air hammer. A mandrel 2 having an uncured asbestos-cement pipe 4 bonded thereto is positioned in the support 6. The mold 12 is inserted over the end of the asbestos-cement pipe 4 so that the end of the pipe moves into the entrance portion 18 of the cavity 14 until it abuts against the walls defining the cavity. The air hammer is actuated so that the mold 12 is repeatedly impacted against the end portion of the pipe 4. The air hammer is held against the end portion of the pipe with sufficient force to insure axial movement of the cavity 14 of the mold over the end portion of the pipe as the end portion gradually assumes the profile of the cavity 14 of the mold 12. The repeated impacting relationship between the mold 12 and the end portion of pipe 4 gradually condenses and forms the end portion of pipe 4 into the profile defined by the mold 12. When the end portion of the pipe 4 has been completely received into the mold 12, the impacting motion is stopped and the mold 12 is removed from the pipe. The asbestos-cement pipe 4 is then removed from the mandrel so as to provide an asbestos-cement pipe 4 having a desired end profile thereon as illustrated in FIG. 4.

The foregoing description relates to the preferred embodiment of the instant invention and it will be understood that various changes and modifications of the preferred embodiment may suggest themselves to one skilled in the art. It is intended that all changes and modifications of this nature will fall within the scope of the invention as defined by the subjoined claims.

What I claim is:

1. In the manufacture of asbestos-cement pipe wherein a wet sheet of asbestos-cement material is wound around a rotating mandrel while applying high pressure thereto to form on said mandrel a substantially uncured asbestos-cement pipe, the method for forming a spigot end profile on said asbestos-cement pipe comprising:
  (a) supporting said mandrel having said substantially uncured asbestos-cement pipe bonded thereto in a relatively fixed position,
  (b) placing a rigid mold having an internal cavity having a profile complementary to the profile desired for the external peripheral surface of the end portion of said pipe over the end portion of said mandrel and in contact with said end portion of said pipe, and
  (c) repeatedly impacting said mold against said end portion of said pipe while urging relative axial movement between said mold and said end portion of said pipe toward each other to condense and compact the asbestos-cement material in said end portion of said pipe until said end portion of said pipe has been formed into the profile defined by said internal cavity.

2. In the manufacture of the asbestos-cement pipe wherein a wet sheet of asbestos-cement material is wound around a rotating mandrel while applying high pressure thereto to form on said mandrel a substantially uncured asbestos-cement pipe, the method for forming a spigot end profile on said asbestos-cement pipe comprising:
  (a) supporting said mandrel having said substantially uncured asbestos-cement pipe bonded thereto in a fixed position,
  (b) placing a rigid mold having an internal cavity having a profile complementary to the profile desired for the external peripheral surface of the end portion of said pipe over the end portion of said mandrel and in contact with said end portion of said pipe, and
  (c) repeatedly impacting said mold against said end portion of said pipe while applying a force tending to move said mold over said end portion of said pipe to condense and compact the asbestos-cement material in said end portion of said pipe until said end portion of said pipe has been formed into the profile defined by said internal cavity.

3. Apparatus for forming a spigot end profile on asbestos-cement pipe which has been formed by winding a wet sheet of asbestos-cement material around a rotating mandrel while applying high pressure thereto comprising:
  (a) means for supporting a mandrel having a substantially uncured asbestos-cement pipe bonded thereto in a relatively fixed position,
  (b) a rigid mold having an internal cavity having a profile complementary to the profile desired for the external peripheral surface of the portion of said pipe, and having an average inside diameter less than the average outside diameter of said pipe on said mandrel, and
  (c) means for repeatedly impacting said mold against said end portion of said pipe while urging said end portion of said pipe into said internal cavity to condense and compact the asbestos-cement material in said end portion of said pipe until said end portion of said pipe has been formed into the profile defined by said internal cavity.

4. Apparatus as defined in claim 3 wherein said impacting means comprises:
  (a) an air hammer.

References Cited
UNITED STATES PATENTS

| | | | |
|---|---|---|---|
| 1,610,295 | 12/1926 | Latham | 264—275 X |
| 1,921,544 | 8/1933 | Shipley | 25—39 |
| 2,361,933 | 11/1944 | Ferla | 18—19 |

ROBERT F. WHITE, *Primary Examiner.*

J. A. FINLAYSON, *Assistant Examiner.*